United States Patent [19]

Franceschini

[11] Patent Number: 5,205,060
[45] Date of Patent: Apr. 27, 1993

[54] DECOY LEG ATTACHMENT ASSEMBLY

[75] Inventor: Augusto Franceschini, Rero, Italy
[73] Assignee: Carry-Lite, Inc., Milwaukee, Wis.
[21] Appl. No.: 919,725
[22] Filed: Jul. 24, 1992
[51] Int. Cl.[5] ............................................ A01M 31/06
[52] U.S. Cl. ............................................ 43/3; 446/97
[58] Field of Search .................... 43/2, 3; D22/125; 446/99, 97, 100

[56] References Cited

U.S. PATENT DOCUMENTS

| | | |
|---|---|---|
| 1,629,442 | 5/1927 | Geisinger . |
| 1,859,268 | 5/1932 | Larson . |
| 2,787,074 | 4/1956 | Miller ........................ 43/3 |
| 2,816,384 | 8/1956 | Rexius ........................ 43/3 |
| 3,435,550 | 4/1969 | Carlson ...................... 43/3 |
| 3,800,457 | 4/1974 | Barrett ....................... 43/3 |
| 3,916,553 | 11/1975 | Lynch et al. ................ 43/3 |
| 3,927,485 | 12/1975 | Thorsnes .................... 43/3 |
| 4,651,457 | 3/1987 | Nelson et al. ............... 43/3 |
| 4,658,530 | 4/1987 | Ladehoff ..................... 43/3 |
| 4,885,861 | 12/1989 | Gazalski ...................... 43/3 |

FOREIGN PATENT DOCUMENTS 1385023  2/1975  United Kingdom ........... 43/3

*Primary Examiner*—Richard K. Seidel
*Assistant Examiner*—Jeanne M. Elpel
*Attorney, Agent, or Firm*—Nilles & Nilles

[57] ABSTRACT

A leg attachment assembly for large bird decoys with the main body of the decoy being separable from a leg support structure is disclosed. A rectangular, tab-like insert portion of the leg support structure slidingly fits into a complementary, rectangular sleeve-like opening in the underside of the main body of the decoy. Upward projecting supports extending from the tab-like insert fit snugly around the side edges of the rectangular sleeve-like opening and the supports have angled upper edges which abut upwardly against complementary angled support surfaces to support the decoy in a proper upright position. An angled fastening bar mounts the decoy firmly in the ground.

3 Claims, 2 Drawing Sheets

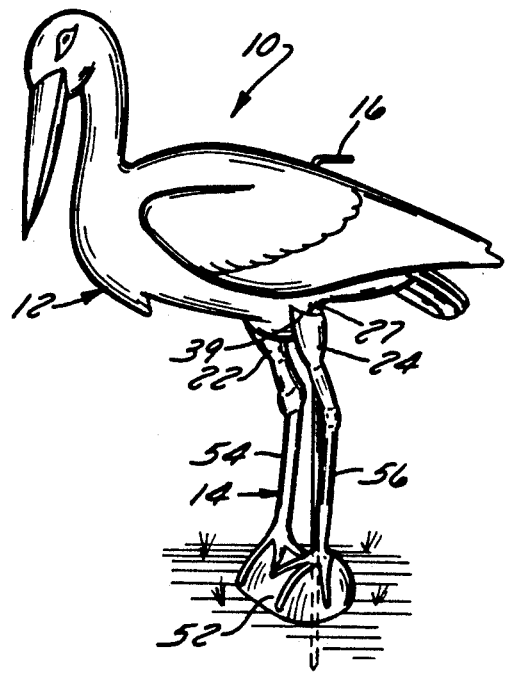

DECOY LEG ATTACHMENT ASSEMBLY

BACKGROUND OF THE INVENTION

This invention relates to a leg attachment assembly for a bird decoy, in particular, to a decoy for a relatively large bird such as a stork or heron, and to a decoy mounted in the ground such as in a field for hunting or in a garden.

Many types of artificial birds or decoys are known in the field. Some are designed primarily for use in hunting to attract live birds, others are for aesthetic purposes only (e.g. lawn and garden displays), and others are appropriate for either use.

A characteristic found in many decoys is that the upper body of the decoy is often provided with the shape, texture and colors to simulate a live bird in fine detail, but the lower body and legs are often provided with virtually no detail similar to those parts of a real bird. The mounting assembly of such a decoy typically comprises a simple rod shoved into the ground with the legless body mounted on the top of the rod. This lack of detail for the legs and lower portion of the decoy may be of little consequence for decoys which float on the water, since the bottom portion of the decoy lies below the surface and cannot be seen. However, when the decoy is displayed on the ground, whether for hunting in fields or for lawn and garden displays, the straight, lifeless rod typically used to support the body of the decoy can be easily seen.

A separate mounting assembly or "leg" assembly is normally required for large decoys for the purposes of ease of manufacturing, shipping, and in the case of hunting for transporting decoys to and from the hunting area. One known decoy which provides a lifelike looking leg section connects that section to the body with plastic snap protrusions which are inserted into corresponding holes in the side of the body of the decoy. Such snap-in plugs are often difficult to assemble, very difficult to disassemble, and relatively expensive to manufacture due to the tolerance requirements for the snap in plugs. Further, after a number of uses, the plug-in connections may become worn and fail to fit snugly together as originally designed.

The drawbacks and objectionable features of the presently known methods of mounting the decoy therefore relate primarily to either lack of detail in the underside and leg structure of the decoy; difficulty in assembly or disassembly of the legs to the body of the decoy; and difficulty and expense in manufacturing the decoy.

SUMMARY OF THE INVENTION

A decoy leg attachment assembly for connecting lifelike looking legs to the body of a bird decoy, in which the attachment assembly is very easy for the user to assemble and disassemble and is inexpensive to manufacture, is disclosed.

The leg attachment assembly for the decoy includes an upper main body in the shape of a bird, a lower support structure in the shape of the bird's legs, and a steel fastening bar for securing the assembly to the ground. The main body has on its lower side an elongated, slotted sleeve-like opening. The lower support structure has on its upper end an upper flattened section which slidingly fits into the sleeve-like opening in the main body. Thus, the lower support structure of the legs is easily insertable and removable from the opening in the upper main body.

The lower support structure also has extending from the outer sides of the upper flattened section, two outer, upward projecting portions which each fit snugly around the side ends of the sleeve-like opening of the main body. By further providing the upward projecting portions with angled upper edges to abut against corresponding angled support surfaces on the main body, the decoy is supported in a proper upright position, and the body does not tip due to wind or the weight of the upper main body.

The long steel fastening bar extends the full height of the decoy and it is angled at one end and pointed at the other end. The steel fastening bar is slidably insertable and removable through the main body, and through the lower support structure to secure the decoy.

The decoy may be transported in the disassembled state to a hunting area, at which point the hunter can easily assemble the decoy by slidingly inserting the lower support structure into the slotted sleeve-like opening of the main body, and then slidingly inserting the steel fastening bar to secure the decoy in place. After the hunt, the hunter may easily disassemble the decoy by slidingly removing the fastening bar and by slidingly removing the lower support structure from the upper main body. This leg assembly system is particularly well suited for larger birds such as storks, blue herons, pelicans, cranes, geese and the like. The fittings also do not become worn due to repeated assembly and disassembly of the decoy.

The primary objects of the invention are therefore to provide a bird decoy which includes a realistic looking leg support structure which is easily assembled and disassembled from the main body of the decoy; which when assembled maintains the decoy in the proper upright position despite the force of high wind; avoids the use of snap-in or plug-in fittings; provides fittings do not become worn out due to repeated use; and is relatively inexpensive to manufacture. Other objects and advantages of the invention will become apparent from the following description taken in connection with the accompanying drawings which set forth, by way of illustration and example, certain embodiments of this invention.

BRIEF DESCRIPTION OF THE DRAWINGS

The drawings, which constitute part of this specification and include exemplary embodiments of the present invention, include the following:

FIG. 1 is a perspective view of a decoy including a leg attachment assembly in accordance with the principles of the present invention shown assembled and mounted in the ground.

FIG. 2 is an exploded front plan view of the main body of the decoy and the leg support structure.

FIG. 3 is an enlarged front view showing the connection of the leg support structure to the main body of the decoy.

FIG. 4 is a section view of the leg attachment assembly of the present invention taken from line 4—4 of FIG. 3.

DETAILED DESCRIPTION

Figure 5:
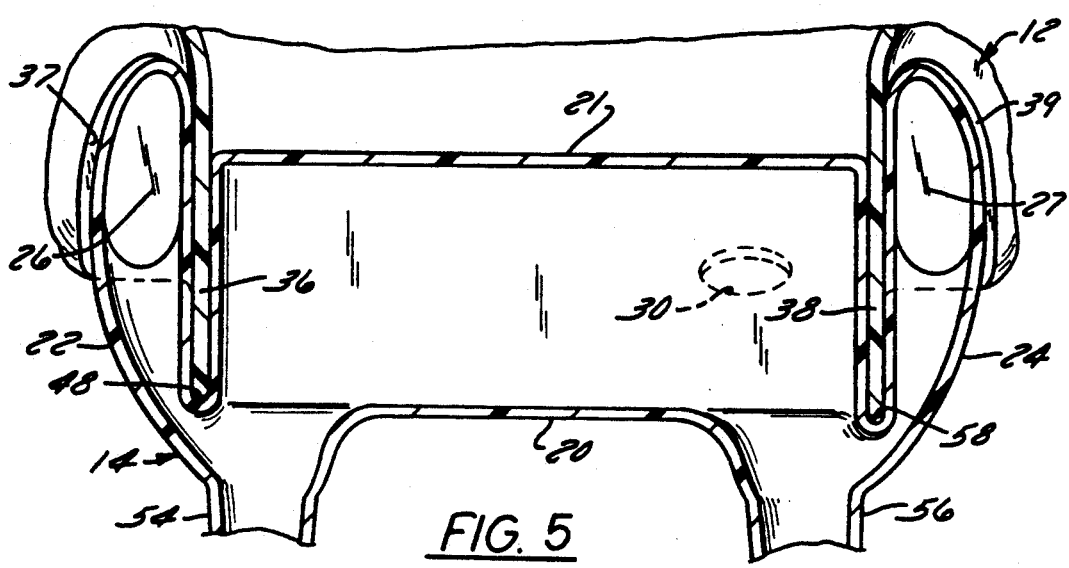
FIG. 5 is a section view of the leg attachment system of the present invention taken from line 5—5 of FIG. 4.
Figure 6:
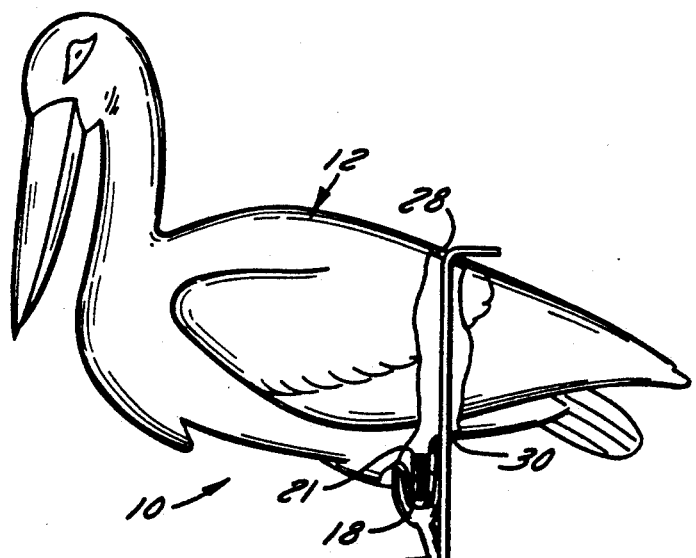
FIG. 6 is a side plan view partially in section showing a fully assembled leg attachment assembly in accordance with the present invention.

The present invention of a leg attachment assembly for a decoy 10 comprises an upper main body 12 formed with a contour and texture and painted with the colors to provide a detailed simulation of the particular bird sought to be simulated. The figures depict in particular a stork. From the underside of the main body, an elongated, slotted, sleeve protrudes downward and outward to form a rectangular opening 18 in the lower side of the main body 12. The center portion 40 of the front side of the rectangular opening 18 is molded to conform to the adjacent surface of the front underside portion (i.e. the belly area) of the decoy. Similarly, the center portion 50 of the rear side of the sleeve-like rectangular opening 18 is molded to conform to the adjacent surface of the rear underside of the decoy, so that the assembly connection appears to be the normal part of the bird. The right and left side portions 42 and 44 of the front side of the sleeve-like rectangular opening 18 are flat and extend generally straight downward from the underside of the decoy. Further, the side portions 42 and 44 of the front face of the rectangular opening 18 meet the center portion 40 which molds into the underside along a generally U-shaped crease or joint 46, thereby providing a stiffening support for the sleeve-like rectangular opening 18.

The right and left outer side edges 36 and 38 of the rectangular opening 18 extend generally perpendicularly from the underside of the main body, i.e. generally straight downward from the underside of the decoy toward the ground when the decoy is in an upright position. The right and left straight side edges 36 and 38 of the rectangular opening 18 merge into right and left support surfaces, 37 and 39 respectively. Each support surface 37 and 39 is inclined from an upper front portion to a lower rear portion.

The decoy further comprises a lower support structure 14 simulating the birds legs. The lower support structure includes a relatively wide mound section 52 for setting the support structure 14 on the ground, a pair of legs 54 and 56 extending upward therefrom, and an upward cross support section 20, thus forming essentially a box-like frame.

The lower support structure 14, at the upper cross section 20, includes an upper flattened section in the form of a tab-like insert 21 having a rectangular cross-section complementary to the rectangular opening 18 on the underside of the main body. The tab-like insert 21 extends across from the right leg 54 to the left leg 56. Extending from the right and left sides of the tab-like section are right and left upward projecting supports, 22 and 24 respectively. The right and left upward projecting supports fit snugly around the right and left side edges 36 and 38, respectively, of the rectangular sleeve-like opening 18 of the main body of the decoy. Further, the top side of each upward projecting support has an inclined upper edge 26 and 27 complementary to the inclined support surface 37 and 39 on the main body 12 such that when the lower support structure is assembled to the main body 12, the inclined upper edges 26 and 27 of the right and left upward projecting supports 22 and 24 abut up against the right and left inclined support surfaces 26 and 27, respectively, thereby supporting the decoy in a proper upright position.

Further, the outer sides of the tab-like insert 21 and the inner sides of the upward projecting supports 22 and 24 form deep V-sections 48 and 58 into which side edges of the rectangular sleeve-like opening fit. The V-sections 48 and 58 provide an easy alignment of the parts when being assembled by the user, and the bottoms of the V-sections 48 and 58 provide a resting surface for the bottom of the edges 36 and 38 of the sleeve-like opening 18 to rest on.

On the main body 12, a first hole 28 is provided on the top surface and a second hole 30 on the underside, and a third hole 32 is provided in the mound section 52 of the lower support structure 14. The steel fastening bar 16 slidably fits into the holes, with a pointed end inserted into the ground and an angled end resting against the top surface of the main body 12 of the decoy, thereby providing a sturdy mounting member to hold the decoy up right even against high wind.

The leg attachment assembly described above thus provides a finely detailed leg support structure for a decoy which is very easy for the user to assemble and disassemble without the need for parts which plug or snap together, which is strong without the use of added support pieces or added material, and which is easy to manufacture.

I claim as my Invention:

1. A decoy including a leg attachment assembly comprising:
   an upper main body in the shape of a bird;
   a lower support structure in the shape of the bird's legs;
   a fastening bar angled at one end and pointed at the other end;
   the main body having on its lower side an elongated, slotted, sleeve opening;
   the lower support structure having on its upper end a tab section which slidingly fits into the sleeve opening in the main body;
   the lower support structure also having extending from outer sides of the tab section, two outer, upward projecting supports which each fit snugly around side edges of the sleeve opening of the main body;
   the upward projection supports having angled upper edges which abut against corresponding angled support surfaces on the main body for supporting the upper main body in an upright position; and
   the fastening bar extending the full height of the decoy and being slidable through a first hole in the upper surface of the main body, through a second hole in the lower surface of the main body, and through a third hole in the lower support structure, and one end of the bar being angled for holding the main body in place and the other end being pointed for inserting it into the ground to secure the decoy.

2. The decoy according to claim 1, further comprising a center portion of front and rear sides of the sleeve opening, each with center portion being molded to conform to the underside of the decoy, and the front and rear sides of the sleeve opening being generally flat and ending generally downward from the underside of the decoy, and the center portion and the side portions for each of the front and rear faces meeting along a generally U-shaped crease.

3. The decoy according to claim 2, further comprising the tab section of the lower support structure and the two outer, upward projecting supports forming two deep V-sections, with the side edges of the sleeve opening fitting snugly into and resting against the bottom of the V-sections.

* * * * *